US012619673B2

(12) United States Patent (10) Patent No.: US 12,619,673 B2
Xu et al. (45) Date of Patent: May 5, 2026

(54) INFORMATION DISPLAY METHOD AND APPARATUS, MEDIUM, AND ELECTRONIC DEVICE

(71) Applicant: Beijing Youzhuju Network Technology Co., Ltd., Beijing (CN)

(72) Inventors: Han Xu, Beijing (CN); Jinming Zhang, Beijing (CN); Jiaqian Zhang, Beijing (CN); Shengyan Shi, Beijing (CN); Shijia Li, Beijing (CN); Guoping Wu, Beijing (CN); Xiangjie Ge, Beijing (CN); Wenkai Gan, Beijing (CN); Junhai Deng, Beijing (CN); Xiaoli Zhou, Beijing (CN); Linjuan Miao, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/917,926

(22) Filed: Oct. 16, 2024

(65) Prior Publication Data

US 2025/0124096 A1 Apr. 17, 2025

(30) Foreign Application Priority Data

Oct. 17, 2023 (CN) ........................ 202311345066.X

(51) Int. Cl.
G06F 16/9538 (2019.01)
G06F 9/451 (2018.01)

(52) U.S. Cl.
CPC .......... *G06F 16/9538* (2019.01); *G06F 9/453* (2018.02)

(58) Field of Classification Search
CPC .... G06F 16/9538; G06F 9/453; G06F 16/957; G06F 3/0481; G06F 3/04855; G06F 9/451; G06F 16/9532
See application file for complete search history.

(56) References Cited

U.S. PATENT DOCUMENTS

| | | | |
|---|---|---|---|
| 9,298,840 B2 * | 3/2016 | Chand | .................... G06F 16/958 |
| 2005/0027596 A1 * | 2/2005 | Bender | .............. G06Q 30/0224 |
| | | | 705/14.1 |
| 2009/0265347 A1 * | 10/2009 | Reed | ...................... G06F 16/34 |
| | | | 715/810 |
| 2013/0290862 A1 * | 10/2013 | Chand | ................. G06F 16/9535 |
| | | | 715/745 |
| 2013/0346888 A1 * | 12/2013 | Smith | ................. G06F 3/04812 |
| | | | 715/760 |
| 2016/0381434 A1 * | 12/2016 | Pulido | .............. H04N 21/23418 |
| | | | 725/19 |
| 2018/0329587 A1 * | 11/2018 | Ko | ......................... G06F 3/0482 |
| 2022/0329910 A1 * | 10/2022 | Resnick | ............. H04N 21/4788 |

FOREIGN PATENT DOCUMENTS

CN 114912039 A 8/2022

* cited by examiner

*Primary Examiner* — Jared M Bibbee
(74) *Attorney, Agent, or Firm* — BakerHostetler

(57) ABSTRACT

The present disclosure provides an information display method and apparatus, a medium, and an electronic device. The method includes: acquiring, in response to a search operation, a search result corresponding to the search operation, the search result includes a homepage of a target account that is associated with a search term corresponding to the search operation; displaying the homepage in a visual interface synchronously, and displaying an Easter egg superimposed on a picture that is displayed in a specified region of the homepage.

18 Claims, 5 Drawing Sheets acquiring, in response to a search operation, a search result corresponding to the search operation, the search result comprises a homepage of a target account that is associated with a search term corresponding to the search operation

110 displaying the homepage in a visual interface synchronously, and displaying an Easter egg superimposed on a picture that is displayed in a specified region of the homepage

120 acquiring, in response to a search operation, a search result corresponding to the search operation, the search result comprises a homepage of a target account that is associated with a search term corresponding to the search operation    110 displaying the homepage in a visual interface synchronously, and displaying an Easter egg superimposed on a picture that is displayed in a specified region of the homepage    120

Fig. 1 search region search result region visual interface

INFORMATION DISPLAY METHOD AND APPARATUS, MEDIUM, AND ELECTRONIC DEVICE

CROSS-REFERENCE TO RELATED APPLICATION

The present application claims priority of the Chinese Patent Application No. 202311345066.X, filed on Oct. 17, 2023, the disclosure of which is incorporated herein by reference in its entirety.

TECHNICAL FIELD

The present disclosure relates to the technical field of electronic information, and specifically relates to an information display method and apparatus, a medium, and an electronic device.

BACKGROUND

With the continuous development of Internet technology and terminal technology, the interaction between terminals and users is becoming more and more diversified, for example, the Easter egg event in an application client is an important means to improve the interaction between terminals and users. Easter egg refers to a hidden dynamic effect that is actively triggered based on user input in the application client.

Since the diversity and interest of Easter egg activity are important factors affecting the interaction effect between the terminals and the users, how to optimize the information display to improve human-computer interaction effect with a new interactive form is a technical problem that needs to be solved urgently in this field.

SUMMARY

The summary is provided to introduce concepts in a simplified form, and the concepts are described in more detail below in the detailed description. The summary is not intended to identify key features or essential features of the claimed subject matter, nor is it intended to be used to limit the scope of the claimed subject matter.

In a first aspect, the present disclosure provides an information display method, which includes:

acquiring, in response to a search operation, a search result corresponding to the search operation, the search result includes a homepage of a target account that is associated with a search term corresponding to the search operation;

displaying the homepage in a visual interface synchronously, and displaying an Easter egg superimposed on a picture that is displayed in a specified region of the homepage.

In a second aspect, the present disclosure provides an information display apparatus, which includes:

a first response module, configured to acquire, in response to a search operation, a search result corresponding to the search operation, the search result includes a homepage of a target account that is associated with a search term corresponding to the search operation; and a first display module, configured to display the homepage in a visual interface synchronously, and display an Easter egg superimposed on a picture that is displayed in a specified region of the homepage.

In a third aspect, the present disclosure provides a computer-readable medium, on which computer programs are stored, and the computer programs, when executed by a processing apparatus, implement the steps of the method according to the first aspect.

In a fourth aspect, the present disclosure provides an electronic device, which includes:

a storage apparatus, on which computer programs are stored; and a processing apparatus, configured to execute the computer programs in the storage apparatus to implement the steps of the method according to the first aspect.

According to the above technical solution, the method includes: acquiring, in response to a search operation, a search result corresponding to the search operation; displaying the homepage in a visual interface synchronously, and displaying an Easter egg superimposed on a picture that is displayed in a specified region of the homepage. Since the Easter egg is only displayed superimposed on the picture that is displayed in the specified region of the homepage, a user can interact with other regions except the specified region in the visual interface during the display of the Easter egg, to avoid the situation that interaction between the user and the terminal is strongly blocked, which is caused by the Easter egg displayed in a form of a popup window covering the whole window of the visual interface, thereby realizing the display of the Easter egg in the search scene in a new interaction mode, and improving the man-machine interaction effect.

Other characteristics and advantages of the present disclosure are described in detail in subsequent detailed description.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale. In the drawings:

FIG. 1 is a flowchart of an information display method according to an exemplary embodiment of the present disclosure.

DETAILED DESCRIPTION

Figure 2:
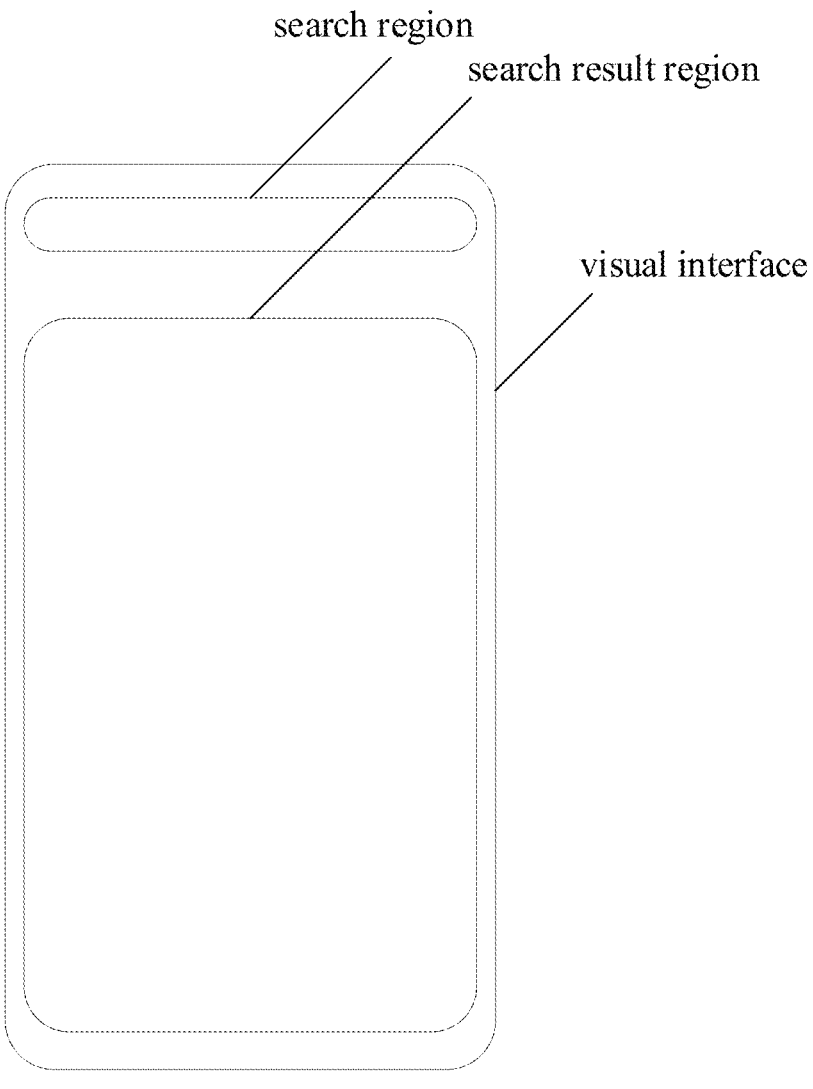
FIG. 2 is a schematic diagram of a visual interface according to an exemplary embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and its variations thereof used in this article are open-ended inclusion, namely "including but not limited to" The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of messages or information in interaction between a plurality of apparatuses in this embodiment of present disclosure are for illustrative purposes only and are not intended to limit the scope of such messages or information.

It is to be understood that before using the technical solutions disclosed in each embodiment of the present disclosure, it is needed to inform the type, scope of use, and use scenes, etc. of the personal information involved in the present disclosure to a user and gain the authorization of the user through appropriate methods in accordance with relevant laws and regulations.

For example, when transmitting prompt information to the user in response to an active request of the user so as to clearly prompt the user, the operation requested to be executed needs to gain and use the personal information of the user. Therefore, the user can autonomously select whether to provide personal information for software or hardware such as an electronic device, an application, a server or a storage medium executing the operation of the technical solution of the present disclosure according to the prompt information.

As an optional but non-limited implementation mode, the mode of transmitting the prompt information to the user in response to receiving the active request of the user can be a popup window mode, and the prompt information can be presented in a character mode in the popup window. In addition, the popup window can also carry a selection control for the user to select "Agree" or "Disagree" to provide personal information for the electronic device.

It is to be understood that the above-mentioned processing of informing and gaining the authorization of the user is only indicative and do not limit the implementation mode of the present disclosure, and other modes that meet the relevant laws and regulations can also be applied to the implementation mode of the present disclosure.

Meanwhile, it is to be understood that data involved in this technical solution (including but not limited to the data itself, acquisition or use of data) shall comply with the requirements of relevant laws and regulations and relevant provisions.

In related technologies, a visual interface of an electronic device is represented by a window, the window is divided into a plurality of layers, a plurality of regions are arranged in each layer, each region is provided with a corresponding component, and the plurality of layers are independent of one another. During displaying an Easter egg in a search scene, the Easter egg usually covers the whole visual interface and is located at the top layer, causing that the Easter egg must be closed so that a user can interact with components of other regions except the Easter egg.

In view of this, embodiments of the present disclosure provide an information display method and apparatus, a medium and an electronic device, which realizes the display of the Easter egg in the search scene in a new interaction mode, thereby improving the man-machine interaction effect.

The embodiments of the present disclosure are further described and explained below in cooperation with the drawings.

Figure 1:
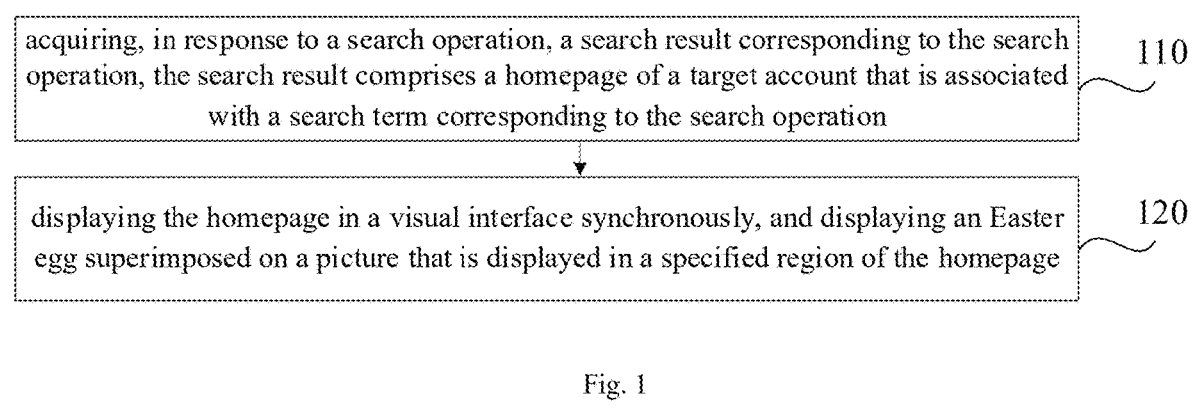

FIG. 1 is a flowchart of an information display method according to an exemplary embodiment of the present disclosure. Embodiments of the present disclosure provide an information display method, the method may be executed through the electronic device, specifically, through an information display apparatus, and the apparatus may be implemented in a software and/or hardware mode and is configured in the electronic device. As shown in FIG. 1, the method includes the following steps:

Step 110: acquiring, in response to a search operation, a search result corresponding to the search operation, the search result includes a homepage of a target account that is associated with a search term corresponding to the search operation.

Step 120: displaying the homepage in a visual interface synchronously, and displaying an Easter egg superimposed on a picture that is displayed in a specified region of the homepage.

FIG. 2 is a schematic diagram of a visual interface according to an exemplary embodiment of the present disclosure. As shown in FIG. 2, the visual interface includes a search region and a search result region, the search region is located at the top of the visual interface, the search result region is located below the search region, and the homepage is displayed in the search result region. A user inputs the search term in the search region in the visual interface of the electronic device and triggers the search operation through a search control, and in responds to the triggered search operation, the electronic device acquires the search term corresponding to the search operation and searches a server for the search result that is related to the search term.

It is to be noted that, in the search scene, a same search term is generally associated with different search results, so there are a plurality of search results under the same search term; the homepage of the target account is one of the search results, the target account is an account of which corresponding contents are preferentially displayed in all the search results related to the search term, and the corresponding contents of the account may be the homepage. That is, in all the search results associated with the search term, the homepage of the target account is preferentially displayed in the visual interface; and it is can be understood that other contents related to the search term may be displayed in addition to the homepage of the target account corresponding to the search term, the other contents related to the search term may be browsed through a slip operation of the user, and the slip operation may be a slip-up operation.

The homepage of the target account may include a plurality of regions, and a corresponding component may be arranged in each region, the specified region is one region in the plurality of regions, and the specified region may be the region with the highest user attention that can be acquired from the plurality of regions, that is, the specified region may be the region which is preferentially displayed in the homepage, such as a live broadcast region and a head map region, etc. The homepage of the target account may also include other regions except the specified region, for example, an account information region, and the account information region may usually display information such as account names and account categories.

It is to be noted that in the homepage of the target account, the specified region is a region preferentially displayed in the homepage, the preferentially displayed region can acquire the highest user attention, and the region is generally located at the head position of the homepage; when the target account is in a live broadcast state, the head position corresponds to the live broadcast region, and a live broadcast picture is played in the live broadcast region; and when the target account is not in the live broadcast state, the head position corresponds to the head map region, a head map is played in loop in the head map region, and generally, the head map may be a static picture or a pre-recorded dynamic video.

It is to be noted that the Easter egg may be displayed by covering the upper portion of the component in the specified region.

Figure 3:
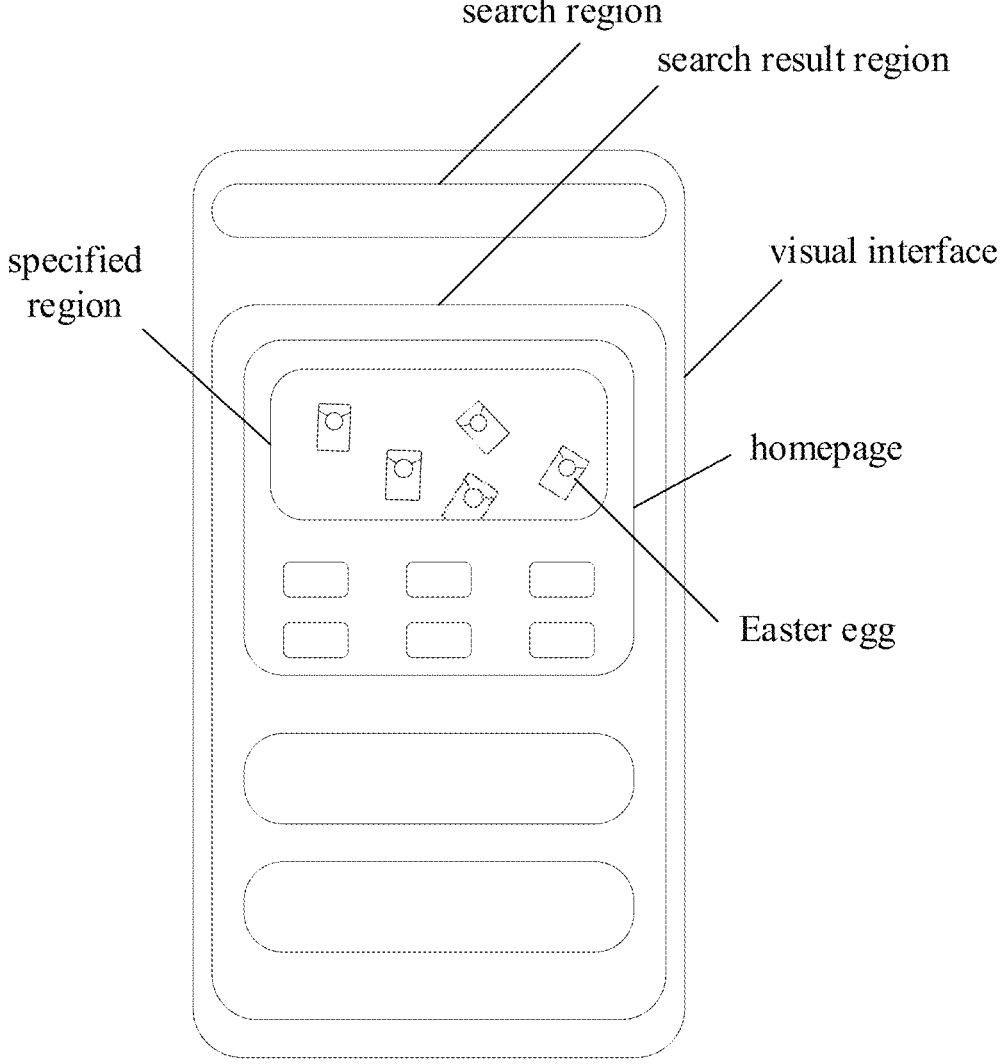
FIG. 3 is a schematic diagram of synchronously displaying t homepage and an Easter egg in a visual interface according to an exemplary embodiment of the present disclosure.

FIG. 3 is a schematic diagram of synchronously displaying a homepage and an Easter egg in a visual interface according to an exemplary embodiment of the present disclosure. As shown in FIG. 3, the Easter egg is displayed by covering the upper portion of the component in the specified region; and it is to be noted that FIG. 3 does not indicate the component in the specified region, and components that are not covered by the Easter egg in the specified region may also be displayed.

The Easter egg supports a function that a user links to another interface through a gesture control operation of the electronic device, the gesture control operation includes click, long press or double click and the like, and another interface may be an interface only including corresponding contents of the target account, a product detail interface, an event detail interface, and the like. These interfaces may be configured by a person holding the target account.

The Easter egg may be of a plurality of types, the plurality of types of Easter eggs may include Easter eggs in a dynamic form or Easter eggs in a static form, which may be configured by the person holding the target account. In a possible mode, when there are a plurality of types of Easter eggs, the person holding the target account can configure the display priority of the Easter eggs, and the electronic device preferentially displays the Easter eggs with higher priority.

In the above way, the method includes: acquiring, in response to a search operation, a search result corresponding to the search operation; displaying the homepage in a visual interface synchronously, and displaying an Easter egg superimposed on a picture that is displayed in a specified region of the homepage. Since the Easter egg is only displayed superimposed on the picture that is displayed in the specified region of the homepage, a user can interact with other regions except the specified region in the visual interface during the display of the Easter egg, to avoid the situation that interaction between the user and the terminal is strongly blocked, which is caused by the Easter egg displayed in a form of a popup window covering the whole window of the visual interface, thereby realizing the display of the Easter egg in the search scene in a new interaction mode, and improving the man-machine interaction effect.

In some embodiments, the information display method may further include the following step: moving, in response to a moving operation for the specified region, the Easter egg following the picture that is displayed in the specified region.

The moving operation is used for achieving moving of the specified region in the visual interface, and the moving includes slip up, slip down, slip right or slip left.

In the process of moving in the specified region, the Easter egg may move following the specified region, which realizes the display of the Easter egg in the search scene in a new interaction mode, thereby improving the man-machine interaction effect.

In some embodiments, the specified region may include a live broadcast region, and correspondingly, the picture that is displayed in the specified region of the homepage may include a live broadcast picture; and the above step of displaying the homepage on the visual interface synchronously, and displaying the Easter egg superimposed on the picture that is displayed in the specified region of the homepage, may include: in response to confirming that the target account is in live broadcast, displaying the homepage in the visual interface synchronously, and displaying the Easter egg superimposed on the live broadcast picture that is displayed in the live broadcast region of the homepage.

As described above, the contents in live broadcast are preferentially displayed on the homepage of the target account, and live broadcast can acquire more attention of the user.

Therefore, when confirming that the target account is in live broadcast, the Easter egg is directly displayed superimposed on the live broadcast picture that is displayed in the live broadcast region of the homepage.

In some embodiments, the specified region may include a head map region, and correspondingly, the picture that is displayed in the specified region of the homepage may include a head map picture; and the above step of displaying the homepage on the visual interface synchronously, and displaying the Easter egg superimposed on the picture that is displayed in the specified region of the homepage, may include: in response to confirming that the target account is not in live broadcast, displaying the homepage in the visual interface synchronously, and displaying the Easter egg superimposed on the head map picture that is displayed in the head map region of the homepage.

The head map picture that is displayed in the head map region may be a video or a single-frame image, and the Easter egg is displayed superimposed on the video or the single-frame image.

It is to be noted that when confirming that the target account is not in live broadcast, the head map region is generally set in the homepage, and the head map region can acquire more attention of the user.

Therefore, when confirming that the target account is not in live broadcast, the Easter egg is directly displayed superimposed on the head map picture that is displayed in the head map region of the homepage.

In some embodiments, the information display method may further include the following step: displaying, in response to confirming that a user watches the Easter egg for a first time on the picture that is displayed in the specified region of the homepage, guide information superimposed on the Easter egg while displaying the Easter egg, the guide information is used for guiding the user to interact with the Easter egg through a gesture control operation.

Whether the user watches the Easter egg for the first time or not may be confirmed according to historical log data of the electronic device.

Figure 4:
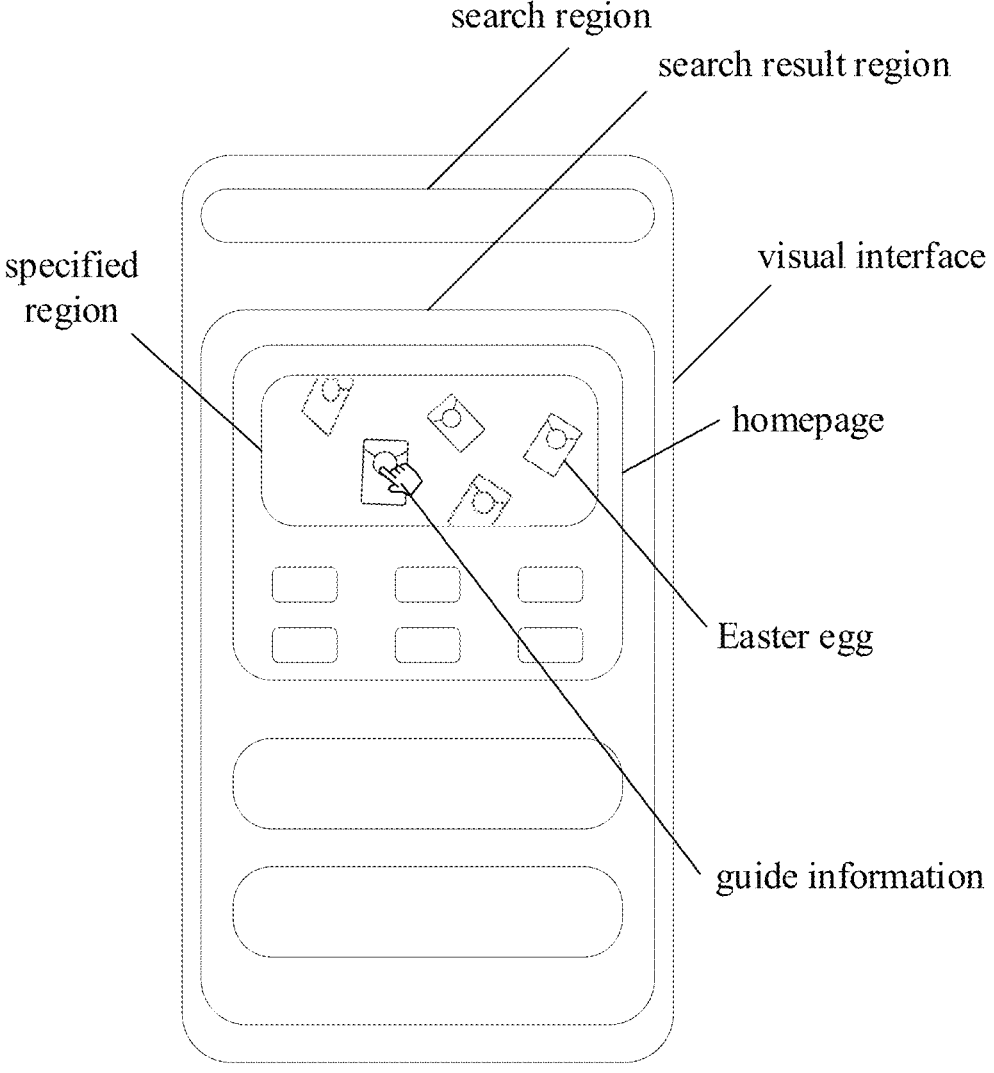
FIG. 4 is another schematic diagram of synchronously displaying a homepage and an Easter egg in a visual interface according to an exemplary embodiment of the present disclosure.

The guide information may be represented by a gesture with a dynamic animation effect. FIG. 4 is another schematic diagram of synchronously displaying a homepage and an Easter egg in a visual interface according to an exemplary embodiment of the present disclosure. The guide information in FIG. 4 is gesture information, which guides a user to perform the gesture control operation through the electronic device so as to interact with the Easter egg, for example, to click the Easter egg to achieve the purpose of linking to another interface.

In this way, the guide information is used for prompting the user to interact with the Easter egg.

In some embodiments, a top edge of the picture that is displayed in the specified region extends to the search region. The specified region extending to the search region has a Gaussian blur effect, so that the display of the search region is not influenced. In some embodiments, the top edge of the picture that is displayed in the specified region does not need to extend to the search region.

In the above way, different display styles of the specified region are supported, so that the diversity of the display styles of the Easter egg is increased, and the user interaction experience is improved.

In some embodiments, it can be known from the above contents that the Easter egg includes a static Easter egg and a dynamic Easter egg, the static Easter egg is an Easter egg in a static form, such as an Easter egg in a single-frame image form, and the dynamic Easter egg is an Easter egg in a dynamic form, such as an Easter egg in a video form. Accordingly, the information display method may further include the following steps: determining network quality before displaying the Easter egg superimposed on the picture that is displayed in the specified region of the homepage; and determining a target Easter egg according to the network quality, the target Easter egg is the Easter egg displayed superimposed on the picture that is displayed in the specified region of the homepage.

It is to be noted that the network quality affects the loading speed of the Easter egg, and when displaying the Easter egg with a poor network, the Easter egg may be lagged, which affects the user interaction experience; and when the network quality o is good, the dynamic Easter egg may be preferentially displayed, thus the animation effect is improved, and the user interaction experience is improved.

Therefore, the Easter egg displayed superimposed on the picture that is displayed in the specified region of the homepage may be determined from the static Easter egg and the dynamic Easter egg as the target Easter egg according to the actual network quality, to improve the user interaction experience.

In some embodiments, after a display duration of the Easter egg reaches a preset duration, the display of the Easter egg is automatically closed, and thus the user can interact with the components in the specified region.

In some embodiments, while displaying the Easter egg in the visual interface, a control for closing the Easter egg may be displayed, and the user may click the control to close the display of the Easter egg. In addition, prompt information may be updated and displayed in real time through the control, the prompt information is used for indicating the automatic closing time of the Easter egg, and the prompt information may be, for example, "automatically close after 5 seconds".

Figure 5:
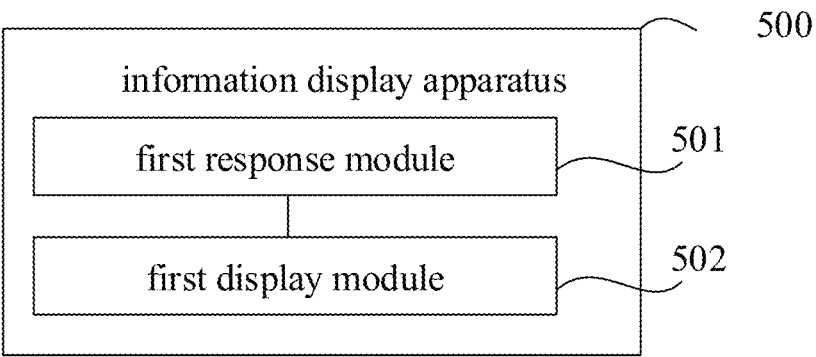
FIG. 5 is a block diagram of an information display apparatus according to an exemplary embodiment of the present disclosure.

FIG. 5 is a block diagram of an information display apparatus according to an exemplary embodiment of the present disclosure, as shown in FIG. 5, the information display apparatus 500 may include the following modules:

a first response module 501, which is configured to acquire, in response to a search operation, a search result corresponding to the search operation, the search result includes a homepage of a target account that is associated with a search term corresponding to the search operation;

a first display module 502, which is configured to display the homepage in a visual interface synchronously, and display an Easter egg superimposed on a picture that is displayed in a specified region of the homepage.

In some embodiment, the information display apparatus 500 further includes:

a second response module, which is configured to implement that, moving, in response to a moving operation for the specified region, the Easter egg following the picture that is displayed in the specified region.

In some embodiments, the specified region includes a live broadcast region, and correspondingly, the picture includes a live broadcast picture; and the first display module 502 is specifically configured to:

display, in response to confirming that the target account is in live broadcast, the homepage in the visual interface synchronously, and display the Easter egg superimposed on the live broadcast picture that is displayed in the live broadcast region of the homepage.

In some embodiments, the specified region includes a head map region, and correspondingly, the picture includes a head map picture; and the first display module 502 is specifically configured to:

in response to confirming that the target account is not in live broadcast, displaying the homepage in the visual interface synchronously, and displaying the Easter egg superimposed on the head map picture that is displayed in the head map region of the homepage.

In some embodiments, the information display apparatus 500 further includes:

a second display module, which is configured to display, in response to confirming that a user watches the Easter egg for a first time on the picture that is displayed in the specified region of the homepage, guide information superimposed on the Easter egg while displaying the Easter egg, and the guide information is used for guiding the user to interact with the Easter egg through a gesture control operation.

In some embodiments, the visual interface includes a search region and a search result region, the search operation is triggered in the search region, the search region is located at top of the visual interface, the search result region is located below the search region, the homepage is displayed in the search result region, and a top edge of the picture that is displayed in the specified region extends to the search region.

In some embodiments, the Easter egg includes a static Easter egg and a dynamic egg; and the information display apparatus 500 further includes:

a first determination module, which is configured to determine network quality before displaying the Easter egg superimposed on the picture that is displayed in the specified region of the homepage; and a second determination module, which is configured to determine a target Easter egg according to the network quality, and the target Easter egg is the Easter egg displayed superimposed on the picture that is displayed in the specified region of the homepage.

The implementation modes of the modules in the information display apparatus 500 may refer to the above-mentioned relevant embodiments, which is not described in detail in the embodiment.

The embodiments of the present disclosure further provide a computer-readable medium, and the computer programs, when executed by a processing apparatus, implement the steps of the method of any one of the above-mentioned information display method.

The embodiments of the present disclosure further provide an electronic device, which includes:

a storage apparatus, on which computer programs are stored; and a processing apparatus, configured to execute the computer programs in the storage apparatus to implement the steps of the method according to any one of the above-mentioned information display method.

Figure 6:
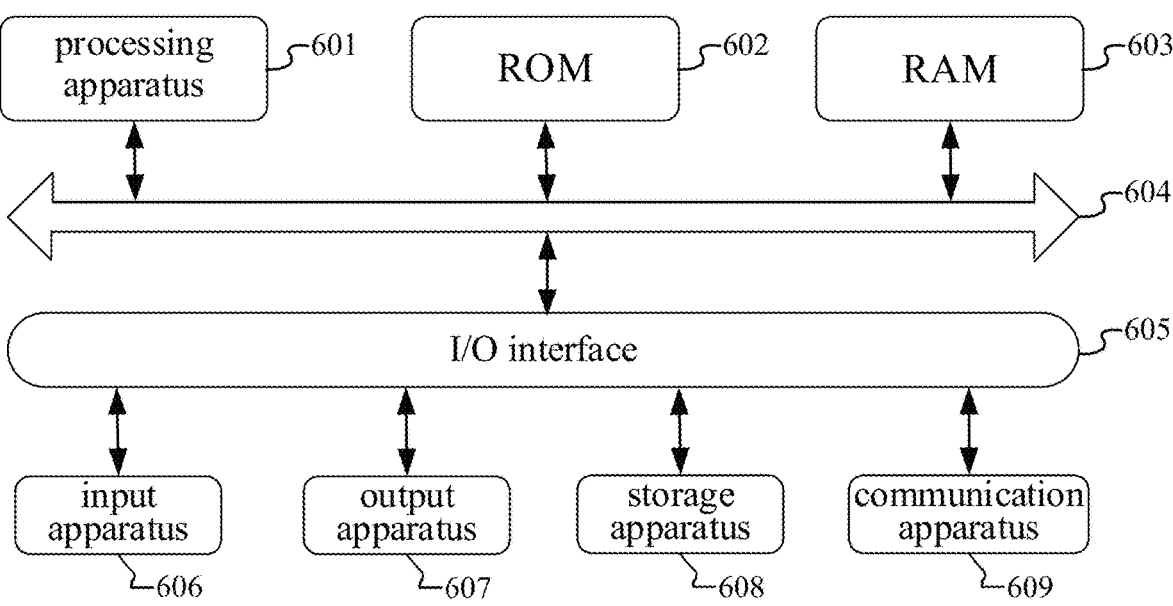
FIG. 6 is a structural schematic diagram of an electronic device according to an exemplary embodiment of the present disclosure.

Referring to FIG. 6, FIG. 6 illustrates a schematic structural diagram of an electronic device 600 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 6 is merely an example, and should not pose any limitation to the functions and the range of use of the embodiments of the present disclosure.

As shown in FIG. 6, the electronic device 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random-access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the electronic device 600 to be in wireless or wired communication with other devices to exchange data. While FIG. 6 illustrates the electronic device 600 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that may be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local region network (LAN), a wide region network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquire, in response to a search operation, a search result corresponding to the search operation, the search result includes a homepage of a target account that is associated with a search term corresponding to the search operation; display the homepage in a visual interface synchronously, and display an Easter egg superimposed on a picture that is displayed in a specified region of the homepage.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local region network (LAN) or a wide region network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, may be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. An information display method, comprising:
acquiring, in response to a search operation, a search result corresponding to the search operation, wherein the search result comprises a homepage of a target account that is associated with a search term corresponding to the search operation;

displaying the homepage in a visual interface synchronously, and displaying an Easter egg superimposed on a picture that is displayed in a specified region of the homepage;

wherein the Easter egg comprises a static Easter egg and a dynamic Easter egg, and the method further comprises:

determining network quality before displaying the Easter egg superimposed on the picture that is displayed in the specified region of the homepage; and determining a target Easter egg according to the network quality, wherein the target Easter egg is the Easter egg displayed superimposed on the picture that is displayed in the specified region of the homepage.

2. The method according to claim 1, further comprising:

moving, in response to a moving operation for the specified region, the Easter egg following the picture that is displayed in the specified region.

3. The method according to claim 1, wherein the specified region comprises a live broadcast region, and correspondingly, the picture comprises a live broadcast picture; displaying the homepage on the visual interface synchronously, and displaying the Easter egg superimposed on the picture that is displayed in the specified region of the homepage, comprises:

in response to confirming that the target account is in live broadcast, displaying the homepage in the visual interface synchronously, and displaying the Easter egg superimposed on the live broadcast picture that is displayed in the live broadcast region of the homepage.

4. The method according to claim 1, wherein the specified region comprises a head map region, and correspondingly, the picture comprises a head map picture; displaying the homepage on the visual interface synchronously, and displaying the Easter egg superimposed on the picture that is displayed in the specified region of the homepage, comprises:

in response to confirming that the target account is not in live broadcast, displaying the homepage in the visual interface synchronously, and displaying the Easter egg superimposed on the head map picture that is displayed in the head map region of the homepage.

5. The method according to claim 1, further comprising:

displaying, in response to confirming that a user watches the Easter egg for a first time on the picture that is displayed in the specified region of the homepage, guide information superimposed on the Easter egg while displaying the Easter egg, wherein the guide information is used for guiding the user to interact with the Easter egg through a gesture control operation.

6. The method according to claim 1, wherein the visual interface comprises a search region and a search result region, the search operation is triggered in the search region, the search region is located at top of the visual interface, the search result region is located below the search region, the homepage is displayed in the search result region, and a top edge of the picture that is displayed in the specified region extends to the search region.

7. A non-transitory computer-readable medium, on which computer programs are stored, and the computer programs, when executed by a processor, cause the processor to implement operations comprising:

acquiring, in response to a search operation, a search result corresponding to the search operation, wherein the search result comprises a homepage of a target account that is associated with a search term corresponding to the search operation;

displaying the homepage in a visual interface synchronously, and displaying an Easter egg superimposed on a picture that is displayed in a specified region of the homepage;

wherein the Easter egg comprises a static Easter egg and a dynamic Easter egg, and the operations further comprise:

determining network quality before displaying the Easter egg superimposed on the picture that is displayed in the specified region of the homepage; and determining a target Easter egg according to the network quality, wherein the target Easter egg is the Easter egg displayed superimposed on the picture that is displayed in the specified region of the homepage.

8. The non-transitory computer-readable medium according to claim 7, wherein the operations further comprise:

moving, in response to a moving operation for the specified region, the Easter egg following the picture that is displayed in the specified region.

9. The non-transitory computer-readable medium according to claim 7, wherein the specified region comprises a live broadcast region, and correspondingly, the picture comprises a live broadcast picture; displaying the homepage on the visual interface synchronously, and displaying the Easter egg superimposed on the picture that is displayed in the specified region of the homepage, comprises:

in response to confirming that the target account is in live broadcast, displaying the homepage in the visual interface synchronously, and displaying the Easter egg superimposed on the live broadcast picture that is displayed in the live broadcast region of the homepage.

10. The non-transitory computer-readable medium according to claim 7, wherein the specified region comprises a head map region, and correspondingly, the picture comprises a head map picture; displaying the homepage on the visual interface synchronously, and displaying the Easter egg superimposed on the picture that is displayed in the specified region of the homepage, comprises:

in response to confirming that the target account is not in live broadcast, displaying the homepage in the visual interface synchronously, and displaying the Easter egg superimposed on the head map picture that is displayed in the head map region of the homepage.

11. The non-transitory computer-readable medium according to claim 7, wherein the operations further comprise:

displaying, in response to confirming that a user watches the Easter egg for a first time on the picture that is displayed in the specified region of the homepage, guide information superimposed on the Easter egg while displaying the Easter egg, wherein the guide information is used for guiding the user to interact with the Easter egg through a gesture control operation.

12. The non-transitory computer-readable medium according to claim 7, wherein the visual interface comprises a search region and a search result region, the search operation is triggered in the search region, the search region is located at top of the visual interface, the search result region is located below the search region, the homepage is displayed in the search result region, and a top edge of the picture that is displayed in the specified region extends to the search region.

13. An electronic device, comprising:

storage apparatus, on which computer programs are stored; and a processing apparatus, configured to execute the computer programs in the storage apparatus to implement operations comprising:

acquiring, in response to a search operation, a search result corresponding to the search operation, wherein the search result comprises a homepage of a target account that is associated with a search term corresponding to the search operation;

displaying the homepage in a visual interface synchronously, and displaying an Easter egg superimposed on a picture that is displayed in a specified region of the homepage;

wherein the Easter egg comprises a static Easter egg and a dynamic Easter egg, and the operations further comprise:

determining network quality before displaying the Easter egg superimposed on the picture that is displayed in the specified region of the homepage; and determining a target Easter egg according to the network quality, wherein the target Easter egg is the Easter egg displayed superimposed on the picture that is displayed in the specified region of the homepage.

14. The electronic device according to claim 13, wherein the operations further comprise:

moving, in response to a moving operation for the specified region, the Easter egg following the picture that is displayed in the specified region.

15. The electronic device according to claim 13, wherein the specified region comprises a live broadcast region, and correspondingly, the picture comprises a live broadcast picture; displaying the homepage on the visual interface synchronously, and displaying the Easter egg superimposed on the picture that is displayed in the specified region of the homepage, comprises:

in response to confirming that the target account is in live broadcast, displaying the homepage in the visual interface synchronously, and displaying the Easter egg superimposed on the live broadcast picture that is displayed in the live broadcast region of the homepage.

16. The electronic device according to claim 13, wherein the specified region comprises a head map region, and correspondingly, the picture comprises a head map picture; displaying the homepage on the visual interface synchronously, and displaying the Easter egg superimposed on the picture that is displayed in the specified region of the homepage, comprises:

in response to confirming that the target account is not in live broadcast, displaying the homepage in the visual interface synchronously, and displaying the Easter egg superimposed on the head map picture that is displayed in the head map region of the homepage.

17. The electronic device according to claim 13, wherein the operations further comprise:

displaying, in response to confirming that a user watches the Easter egg for a first time on the picture that is displayed in the specified region of the homepage, guide information superimposed on the Easter egg while displaying the Easter egg, wherein the guide information is used for guiding the user to interact with the Easter egg through a gesture control operation.

18. The electronic device according to claim 13, wherein the visual interface comprises a search region and a search result region, the search operation is triggered in the search region, the search region is located at top of the visual interface, the search result region is located below the search region, the homepage is displayed in the search result region, and a top edge of the picture that is displayed in the specified region extends to the search region.

* * * * *